United States Patent [19]

Bell

[11] 4,450,585
[45] May 22, 1984

[54] SIGNAL SWITCHING AND COMBINING SYSTEMS FOR DIVERSITY RADIO RECEIVING SYSTEMS

[75] Inventor: Howard T. Bell, Edinburgh, Scotland

[73] Assignee: Ferranti plc, Cheshire, England

[21] Appl. No.: 359,312

[22] Filed: Mar. 18, 1982

[30] Foreign Application Priority Data

Mar. 26, 1981 [GB] United Kingdom ............... 8109470

[51] Int. Cl.³ .......................... H04B 1/16; H04B 7/02
[52] U.S. Cl. .................................. 455/135; 455/137; 455/303
[58] Field of Search ................. 455/52, 133, 134–138, 455/303, 305; 375/100

[56] References Cited

U.S. PATENT DOCUMENTS

| 3,293,607 | 12/1966 | Kalbfell | 375/100 |
| 4,246,655 | 1/1981 | Parker | 455/135 |

FOREIGN PATENT DOCUMENTS

| 52-69512 | 6/1977 | Japan | 455/134 |
| 54-112117 | 9/1979 | Japan | 455/136 |
| 1180440 | 2/1970 | United Kingdom . | |
| 1246246 | 9/1971 | United Kingdom . | |

Primary Examiner—Jin F. Ng
Attorney, Agent, or Firm—Kerkam, Stowell, Kondracki & Clarke

[57] ABSTRACT

A signal switch and combining system for a radio communication system having two receivers ($R_A$, $R_B$) includes a comparator operable to determine which of the receiver output signal to noise ratios is the greatest at any instant. There is also a threshold detector arranged to determine when the difference between the two signal to noise ratios exceeds any one or more of a number of predetermined threshold levels. A gating network (GN) responds to the outputs of the comparator and threshold detector (CT) to control a switching and impedance network SZ. This controls the connection of ratio signals from the two receivers ($R_A$, $R_B$) to an output load. The network is arranged to connect to the load either one of the two radio signals or a combination of the two signals in one of a number of predetermined ratios. The signal to noise ratios of the two receiver output signals are conveniently indicated by the receiver automatic gain control signals.

8 Claims, 13 Drawing Figures

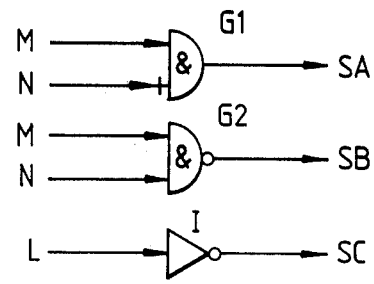
Fig.3.
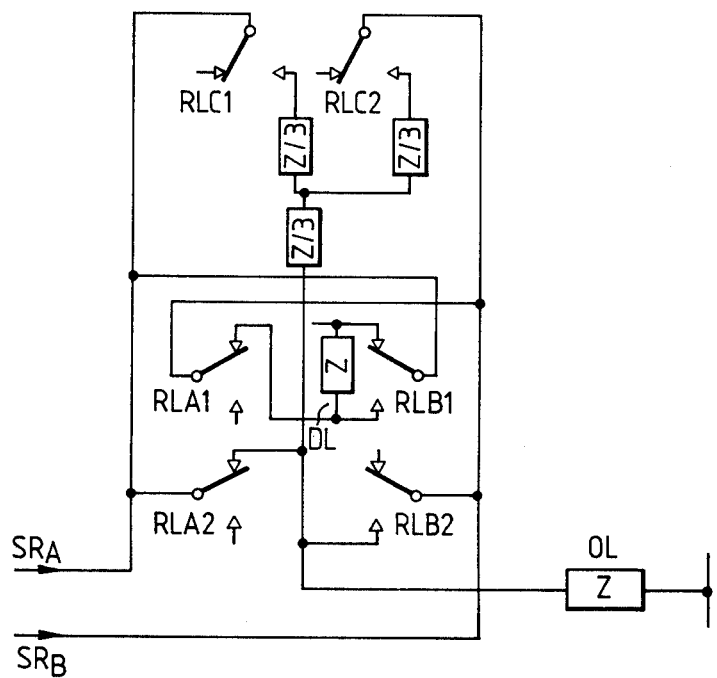
Fig.4.
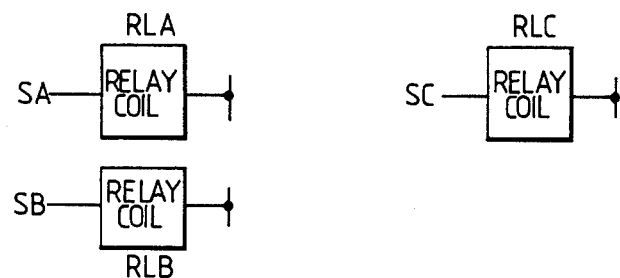

SIGNAL SWITCHING AND COMBINING SYSTEMS FOR DIVERSITY RADIO RECEIVING SYSTEMS

This invention relates to signal switching and combining systems and in particular to such systems for use with radio communication systems employing some form of diversity transmission and/or reception.

In a radio communications system it is possible for the transmitted signal to be attenuated by the varying density of the atmosphere, or multipath propagation caused by refraction or reflection may give rise to destructive interference, with the result that the signal reaching a receiver may be much weaker than was anticipated. Moreover, the effects are variable, leading to "fading" or variation of the received signal strength. Such a problem is usually overcome by employing some form of diversity transmission, of which there are two common forms.

Space diversity operates on the fact that fading will not generally occur simultaneously on two different paths. Hence a single transmitter may be used to transmit simultaneously to two spaced receivers, or rather to two receivers with spaced antenna systems. A diversity switch is used to select the received signal which has the greater freedom from noise.

Frequency diversity operates of the further fact that, to some extent at least, fading effects will be different on signals transmitted at different frequencies. Hence two transmitters are used to transmit the same information to two receivers operating on different frequencies. Again, a diversity switch selects the signal having the least noise.

The diversity switch should produce changeover of the received signal without a change in its amplitude and without the loss of information carried by the signal. Various forms of diversity switch are known. In most cases, the switch selects the signal having the greater signal to noise ratio if the signal to noise ratios of the two signals differ by more than a predetermined amount (usually measured in decibels). If the signal to noise ratios are close, then the two signals may actually be combined in different ways to provide an output signal having a signal to noise ratio better than that which can be obtained from either inpur alone, provided that the signals applied to the switching system are coherent and approximately in phase. Existing diversity switches all have disadvantages, particularly with regard to reliability.

It is an object of the present invention to provide a signal switching and combining system having a new and improved form of diversity switch.

According to the present invention there is provided a signal switching system for a radio communication system having two receivers each providing a coherent radio signal output and an output proportional to the signal to noise ratio of the radio signal, the two radio signals being approximately in phase and of approximately the same amplitude, which includes comparison means operable to determine at any instant which of the two radio signals has the greater freedom from noise, threshold means operable to determine whether at any instant the difference between the two signal to noise ratios exceeds any one or more of a number of predetermined threshold levels, gating means responsive to the output of the comparison means and of the threshold means to derive one or more control signals, switching means responsive to the control signals to connect to an output load either one of the radio signals or a combination of the two radio signals in one of a number of predetermined ratios, and a matching network connected to the switching means and arranged to ensure that the electrical impedance presented to the output load and the radio signal voltage applied thereto remains substantially constant.

The expression "the two radio signals being approximately in phase and of approximately the same amplitude", is used to mean that the two signals must be sufficiently close in phase and amplitude that any disturbance in the signal level in the output load on switching shall be within the limits which any following circuitry can tolerate. The acceptable differences in phase and amplitude cannot therefore be accurately defined, and may vary from one situation to another.

An embodiment of the invention will now be described with reference to the accompanying drawings, in which:

FIG. 3 is a logic diagram of the gating means of FIG. 1;

FIG. 4 is a circuit diagram of the switching means and impedance network of FIG. 1;

FIGS. 5(a) through 5(e) illustrate the possible stable states of the switching means; and FIGS. 6(a) through 6(d) illustrate possible transient states of the switching means.

Figure 1:
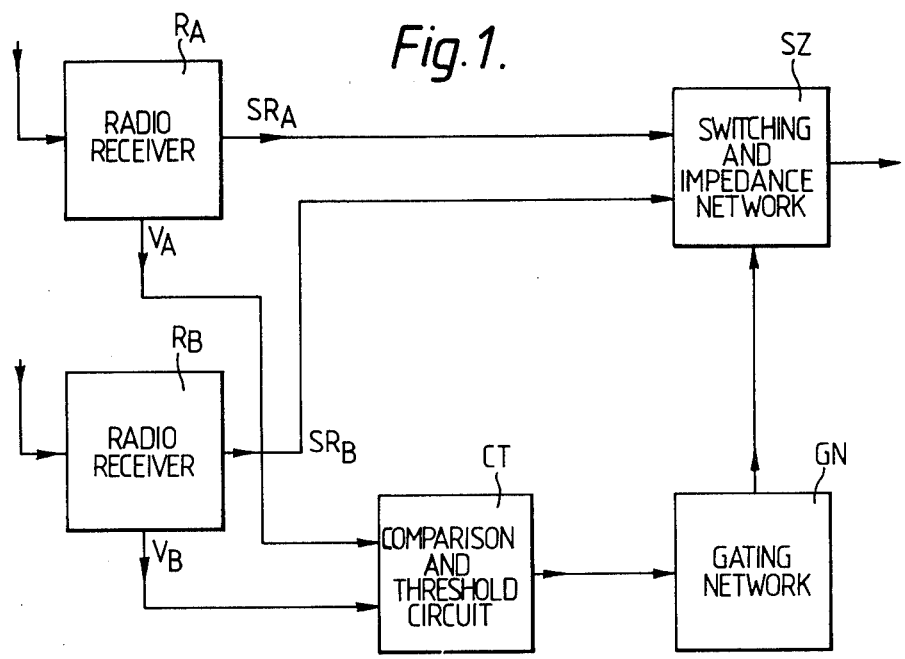
FIG. 1 is a schematic block diagram of a signal switching system.

Referring now to FIG. 1, this shows the signal switching system and two receivers. The receivers $R_A$ and $R_B$ each provide a radio signal output which is connected to a switching and impedance network SZ. Each receiver also produces a voltage proportional to the signal to noise ratio at its output, and this voltage is connected to the comparison and threshold circuit CT. The outputs from this are passed to a gating network GN which provides the actuating signals for the switching and impedance network.

Figure 2:
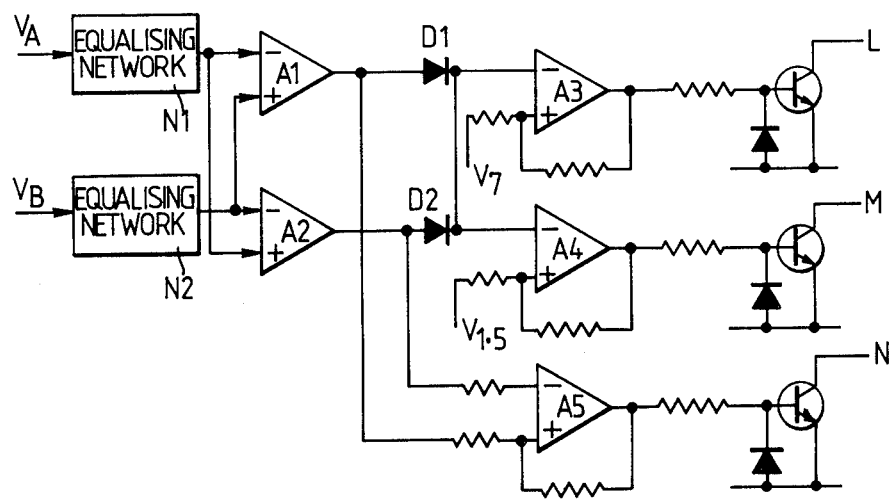
FIG. 2 is a circuit diagram of the comparison and threshold means of FIG. 1.

FIG. 2 shows the comparison and threshold means. The voltage proportional to the signal to noise ratio at the output of receiver $R_A$, designated $V_A$ is applied to an equalising network N1, and the corresponding voltage from receiver $R_B$, designated $V_B$ is applied to an equalising network N2. The outputs of the two networks are applied to two differential amplifiers A1 and A2, the signal from each network being applied to the two amplifiers in opposite senses. The outputs of amplifiers A1 and A2 are connected through diodes D1 and D2, and then connected together and to the inverting inputs of a further pair of differential amplifiers A3 and A4, operating as threshold detectors. Amplifier A3 has a reference voltage designated $V_7$ and equal to the voltage at the inverting input which will represent a 7 dB difference between the signal to noise ratios from the two receivers. Amplifier A4 is connected in a similar manner, having a reference voltage $V_{1.5}$ applied to its non inverting input. This voltage is equal to that which represents a 1.5 dB difference between the signal to noise ratios. A comparator A5 has the outputs of amplifiers A1 and A2 applied to its two inputs.

Connected to the output of each of the amplifiers A3, A4 and A5 is a separate circuit which provides a signal suitable for driving the gating means. Each of these circuits comprises a resistor, a diode and an npn transistor of which the emitter is connected to ground and the collector is connected to the gating means. Hence the output of circuit A3 provides a signal L which indicates that the difference between the two incoming signal to noise ratios is greater or less than 7 dB, the output of circuit A4 provides a signal M which indicates that the difference between the incoming signal to noise ratios is greater or less than 1.5 dB and the output of circuit A5 provides a signal N which indicates that signal to noise ratio at the output of receiver A is greater or less than the signal to noise ratio at the output of receiver B.

The circuit of FIG. 2 operates as follows: The outputs of the two equalising networks N1 and N2 are slowly varying voltages (relative to relay switching times) which are linearly dependent upon the signal to noise ratio seen at the output of the corresponding receiver. Since both outputs are applied to amplifier A1, the output of the amplifier A1 is proportional to the difference between the inputs applied to receivers $R_A$ and $R_B$, measured in dBw. The output of amplifier A2 is of the same magnitude as that of A1, but of opposite sign. The output of diodes D1 and D2, and hence the input to amplifiers A3 and A4 will be whichever of the outputs of amplifiers A1 and A2 is of positive sense.

If, for example, the output of the network N1 represents a signal to noise ratio at the output of receiver A of 30 dB whilst the output of network N2 represents a signal to noise ratio at the output of receiver B of 22 dB, then the output of amplifier A1 will represent a signal difference of $-8$ dB and the output of amplifier A2 will represent a difference of $+8$ dB. The action of diodes D1 and D2 is to apply the more positive voltage, representing $+8$ dB, to threshold detectors A3 and A4, and hence the output voltage from each detector in this case will be negative. The output transistors providing signals L and M will therefore be open circuit, indicating a '1' condition. If the difference in signal to noise rations falls to below 7 dB and then to below 1.5 dB then the circuits will switch in turn to provide a short circuit transistor output, indicating a '0' condition.

With the initial conditions described in the previous paragraph comparator A5 has the $-8$ dB signal applied to its non inverting input and the $+8$ dB signal applied to it inverting input. Thus the amplifier output will be negative, and signal N will also be in the '1' condition, indicating that the input to receiver $R_A$ is greater than the input to receiver $R_B$. Signal N will change if the signal to noise ratio at the output of receiver $R_B$ becomes greater than that at the output of receiver $R_A$.

The signals L, M and N are connected to the gating network of FIG. 3. This network comprises two gates G1 and G2 and an invertor I. Gate G1 is a two input AND gate, having the signal M applied to one input and the signal N applied to the other input, which is an inhibiting input. The output is a switch control signal SA. Gate G2 is a two input NAND gate, having the signals M and N applied to its two inputs. The output is a switch control signal SB. Signal L from the circuit of FIG. 2 is passed through an invertor I to provide a switch control signal SC.

In the example described above in which the input to receiver $R_A$ is greater than the input to receiver $R_B$ by more than 7 dB, then each of the signals L, M and N will be in the '1' condition. Each of the switch control signals SA, SB and SC will then be in the '0' condition, so that none of the switches is operated. It will be seen that changes in the state of any of the signals L, M and N will result in different combinations of the switch control signals SA, SB and Sc being present.

FIG. 4 shows the switching arrangement and impedance network of the system. The switches are shown as pairs of contacts operated, for example, by relays, and each contact is shown with the corresponding relay in the unenergised or released condition. This occurs when the appropriate switch control signal is '0'. Each relay is shown detached from its contracts, the designation of the relay, namely RLA, RLB and RLC being associated with the corresponding contacts RLA1 and RLA2, RLB1 and RLB2, RLC1 and RLC2.

Referring now to FIG. 4, input signals $SR_A$ and $SR_B$ are applied from receivers $R_A$ and $R_B$ respectively, these signals being the radio signals from the receivers. Each signal is connected as determined by switching arrangement to an output load OL. The impedance network included in FIG. 4 shows impedance values relative to that of the load, here designated as Z.

The signal from receiver A is connected to the moving contact of contact sets RLA2. RLB1 and RLC1. The signal from receiver B is connected to the moving contact of contact sets RLA1, RLB2 and RLC2. The normally closed fixed contact of contact set RLA1 is connected to the normally open fixed contact of contact set RLB1 and to a dummy load of impedance DL of impedance Z connected to signal ground. The normally closed fixed contact of contact set RLA2 is connected to the normally open fixed contact of RLB2, to the output load OL of impedance Z, and through an impedance Z/3 to a common point. This common point is connected through an impedance Z/3 to the normally open fixed contact of contact set RLC1 and through a further impedance Z/3 to the normally open fixed contact of contact set RLC2.

It will be appreciated that those parts of a contact set referred to as the 'moving' and 'fixed' contacts respectively may be interchanged.

The output load may be a part of the communication system using the receiver outputs, or it may be part of a receiver. In the latter case those elements referred to above as the receivers may be only part of such elements. For example the switching may be made to use the IF signals within a receiver before demodulation, rather than the receiver baseband outputs.

Figure 5A:
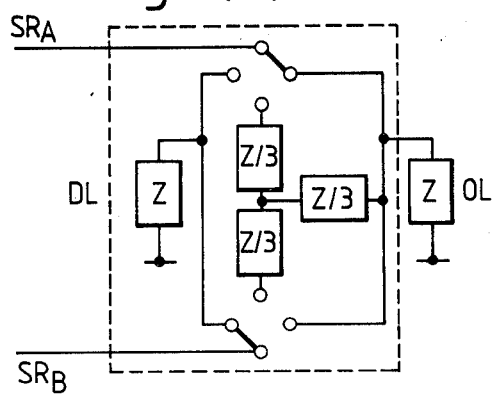

FIGS. 5(a) through 5(e) illustrate the operation of the circuit of FIG. 4, showing the five situations which may exist in normal operation of the system. FIG. 5(a) shows the situation when the signal from receiver $R_A$ exceeds that from receiver $R_B$ by more than 7 dB. As previously explained, in this condition there are no switch control signals, and the relay contacts are in the positions shown in FIG. 4. From FIG. 5(a) it will be seen that the signal $SR_A$ is connected directly to the load, whilst signal $SR_B$ is connected to the dummy load DL. Hence the voltage across the load is that of the signal $SR_A$.

If the signal $SR_A$ falls relative to signal $SR_B$, such that the difference becomes less than 7 dB, then switch control signal SC is produced, causing relay RLC to operate. This produces the situation shown in FIG. 5(b). Due to the arrangement of the impedances, the output load receives two-thirds of the signal $SR_A$ plus one-third of the signal $SR_B$. This is a 2:1 combination ratio in favour of signal $SR_A$.

If the relative strengths of the two signals are within 1.5 dB of each other, then a switch control signal SB will be produced, whether $SR_A$ is greater or less than $SR_B$. FIG. 5(c) shows this situation, in which one-half of each signal is applied to the output load, that is a 1:1 combination ratio.

As signal $SR_B$ becomes stronger than signal $SR_A$, then the situation changes again. When the signal difference reaches 1.5 dB, switch control signal SA is produced, and relay RLA is operated. FIG. 5(d) shows that this results a 2:1 combination ratio in favour of signal $SR_B$. The final condition is when signal $SR_B$ exceeds signal $SR_A$ by more than 7 dB. This results in the disappearance of switch control signal SC, and the release of relay RLC. FIG. 5(e) shows than in this condition signal $SR_B$ is connected directly to the load, whilst signal $SR_A$ is connected to the dummy load. The load is therefore switched to signal $SR_B$.

Provided that the radio signals from the two receivers are coherent, approximately in phase, and of approximately equal amplitude, there will no interruption and no significant alteration in the amplitude of the signal applied to the output load. There are possible transient switch conditions which exist between successive ones of the five stable conditions shown in FIGS. 5(a) through 5(e). FIGS. 6(a) through 6(d) illustrate some of the transient conditions. Between the conditions of FIG. 5(a) and FIG. 5(b) will be one or other of the conditions illustrated at FIG. 6(a) or FIG. 6(b). Which condition exists depends upon which switch operates first. In the situation shown in FIG. 6(a), the signal $SR_A$ is applied directly to the output load as in FIG. 5(a). The situation of FIG. 6(b) is that the signal applied to the output load is, $0.7SR_A + 0.3SR_B$. The total amplitude remains unchanged.

Figure 5B:
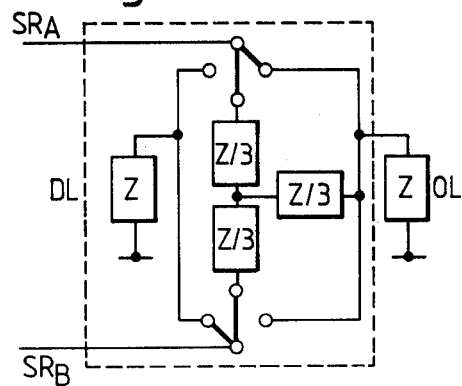
Figure 5C:
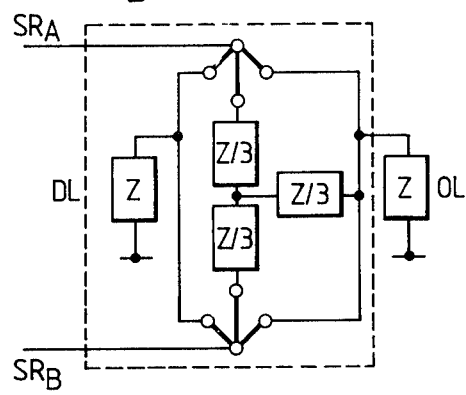
Figure 5D:
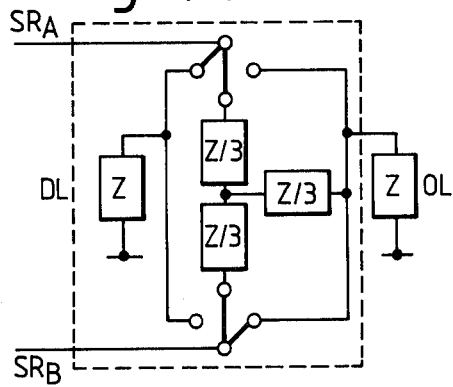
Figure 5E:
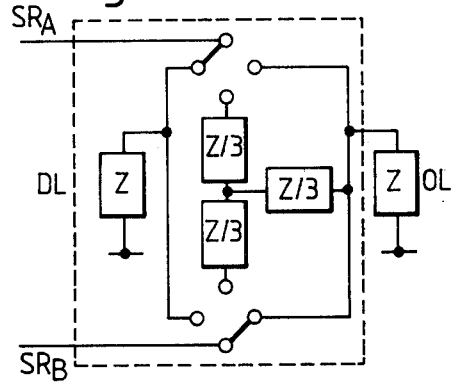
Figure 6A:
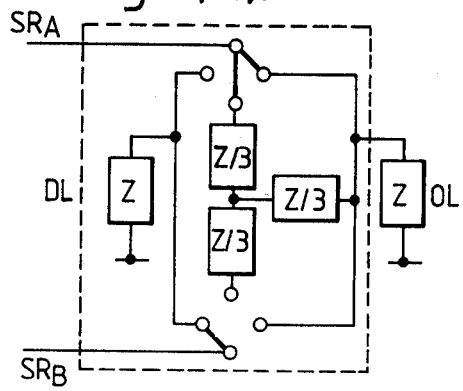
Figure 6B:
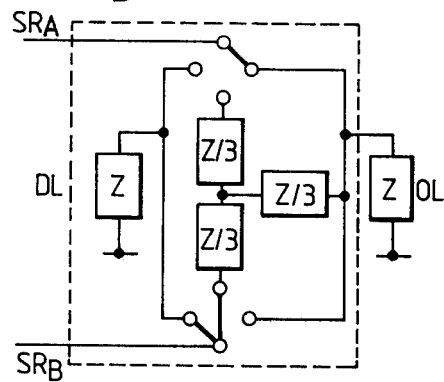
Figure 6C:
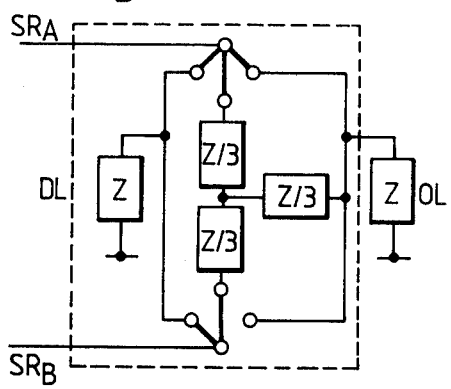
Figure 6D:
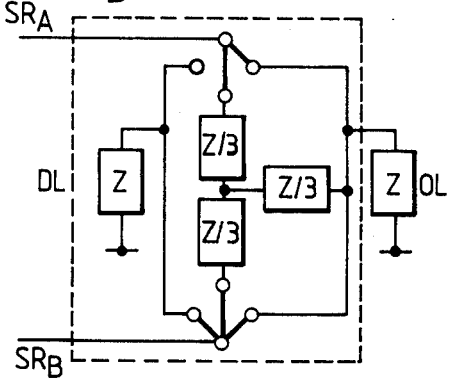

The transient situations shown in FIGS. 6(c) and 6(d) are those which may exist between the condition of FIGS. 5(b) and 5(c). In each of these transient conditions the signal applied to the load is $SR_A/2$ and $SR_B/2$.

Similar transient situations may exist between the conditions of FIGS. 5(c) and 5(d) and those of FIGS. 5(d) and 5(e).

The signal to noise ratios at the outputs of the receivers tend to change relatively slowly, as fading is a generally slow phenomenon when compared with the changeover time of the relays. This means that the operation and contact bounce time of any one relay will be over by the time the next relay is called upon to operate, thus a change from signal $SR_A$ being applied to the load to the application of signal $SR_B$ will normally pass through the intermediate states shown in FIGS. 5(a) through 5(e). Only if one signal vanishes, due to say a receiver fault, will a change occur which may possibly result in a loss of information.

The threshold values of 1.5 dB and 7 dB are chosen to provide signal to noise ratio enhancement at the output of the signal combining switch which compares closely with equal gain combining. This is the commonly used practical closest approach to the theoretically optimum maximal ratio combining method. This signal combining switch provides a significant improvement in signal to noise ratio enhancement over simple 1:1 combining.

Other convenient values may be substituted. Whilst it is possible to provide more than three signal combining situations, further switching and more complex switch control circuitry is required, and care must be taken not to lose the property of "hitless switching" during fast fades.

One of the advantages of the switching system described above is that it requires only passive components in the signal path; active devices are confined to the control circuitry. Thus there is a 'fail safe' condition: should there be a failure of the power supply to the switch, the signal from receiver A will be fed through to the load.

What we claim is:

1. A signal switching and combining system for a radio communication system having two receivers each providing a coherent radio signal output and an output proportional to the signal to noise ratio of the radio signal, the two radio signals being approximately in phase and of approximately equal amplitude, which includes a comparator operable to determine at any instant which of the two signal to noise ratio outputs is greater, a threshold detector including means for determining the difference between the signal to noise ratios and operable to determine whether at any instant the difference between the two signal to noise ratios exceeds either of two of predetermined threshold levels, a gating network responsive to the output of the comparator and of the threshold detector to derive one or more control signals, a switching circuit responsive to said one or more control signal outputs to connect to an output load either one of the coherent radio signals or a combination of the two coherent radio signal outputs in one of a number of predetermined ratios, and a matching network connected to the switching circuit for presenting an electrical impedance and a radio signal amplitude to the load such that said impedance and signal amplitude remain substantially constant.

2. A system as claimed in claim 1 in which the switching circuit is operable to combine the two radio signals in one of at least three different ratios.

3. A system as claimed in claim 1 in which the output proportional to the signal to noise ratio of a radio receiver is the automatic gain control output of that receiver.

4. A system as claimed in claim 1 in which the threshold detector includes a difference amplifier operable to produce an output representing the difference between the two signal to noise ratios, and two circuits each responsive to the output from the difference amplifier and to a separate one of the two predetermined threshold levels to provide an output only when the output from the difference amplifier exceeds the respective threshold level.

5. A system as claimed in claim 1 in which the switching circuit includes a plurality of switches arranged to connect each coherent radio signal to the output load or to the matching network or both as determined by the control signals.

6. A system as claimed in claim 5, in which the switching circuit includes three switching devices for each radio signal, a first one of the switches being actuable to connect the coherent radio signal directly to the output load, a second one of the switches being actuable to connect the coherent radio signal directly to a dummy load having the same impedance as the output load, and the third switch being actuable to connect part only of the coherent radio signal to the output load by way of an impedance network, the three switches being operated by respective ones of the three control signals.

7. A system as claimed in claim 6 in which the matching network includes the dummy load and the impedance network.

8. A system as claimed in claim 6 in which the switching circuit comprises a plurality of contacts operated by a number of electromagnetic relays.

* * * * *